(12) United States Patent
Barton et al.

(10) Patent No.: US 12,328,204 B2
(45) Date of Patent: Jun. 10, 2025

(54) CLOUD-BASED SECURITY CONTROLS FOR MULTI-LEVEL HIERARCHAL EQUIPMENT ACCESS

(71) Applicant: Cisco Technology, Inc., San Jose, CA (US)

(72) Inventors: Robert E. Barton, Richmond (CA); Flemming Stig Andreasen, Marlboro, NJ (US); Jerome Henry, Pittsboro, NC (US); Elango Ganesan, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 197 days.

(21) Appl. No.: 18/087,094

(22) Filed: Dec. 22, 2022

(65) Prior Publication Data

US 2024/0214386 A1 Jun. 27, 2024

(51) Int. Cl.
*H04L 12/46* (2006.01)
*H04L 9/40* (2022.01)
(Continued)

(52) U.S. Cl.
CPC .......... *H04L 12/4633* (2013.01); *H04L 45/56* (2013.01); *H04L 63/0281* (2013.01);
(Continued)

(58) Field of Classification Search
CPC ... H04L 12/4633; H04L 69/321; H04L 61/10; H04L 12/66; H04L 69/08; H04L 67/56;
(Continued)

(56) References Cited

U.S. PATENT DOCUMENTS

| 8,413,227 B2 | 4/2013 | Chen |
| 9,083,751 B2 | 7/2015 | Chambers et al. |

(Continued)

FOREIGN PATENT DOCUMENTS

| KR | 101514579 B1 * | 6/2011 | ............ H04W 12/08 |
| WO | WO-03055176 A1 * | 7/2003 | ......... H04L 63/0272 |

OTHER PUBLICATIONS

Mathezer, Stephen, "The Purdue Model and Best Practices for Secure ICS Architectures", Introduction to ICS Security Part 2, online: https://www.sans.org/blog/introduction-to-ics-security-part-2/, Jul. 16, 2021, accessed Sep. 16, 2022, 13 pages, SANS Institute.
(Continued)

*Primary Examiner* — Kyung H Shin
(74) *Attorney, Agent, or Firm* — BEHMKE INNOVATION GROUP LLC; James M. Behmke; James J. Wong (57) ABSTRACT

In one embodiment, a device determines a hierarchy of layers of a network comprising a plurality of networking devices. The device configures, in response to a request by a client to access remotely a particular endpoint in the network, a proxy chain of remote access agents executed by a plurality of networking devices in the network to allow the client to access remotely the particular endpoint. Each of those networking devices proxies traffic between different layers of the hierarchy. The device determines an access policy for the particular endpoint indicative of which commands may be sent to the particular endpoint by the client, based in part on where the particular endpoint is in the hierarchy. The device controls, based on the access policy, whether a command sent by the client is transmitted via the proxy chain to the particular endpoint.

20 Claims, 10 Drawing Sheets

(51) Int. Cl.
*H04L 45/00* (2022.01)
*H04W 48/16* (2009.01)

(52) U.S. Cl.
CPC .......... *H04L 63/107* (2013.01); *H04L 63/205* (2013.01); *H04W 48/16* (2013.01)

(58) Field of Classification Search
CPC ... H04L 63/205; H04L 63/1416; H04L 63/20; H04L 63/1408; H04L 63/1425; H04L 45/56; H04L 41/0253; H04L 41/0803; H04L 67/02; H04L 45/60; H04L 41/22; H04L 63/0272; H04L 63/101; G06F 9/45558; H04W 12/02; H04W 48/16; H04W 12/10; H04W 12/08; H04W 12/108; H04W 12/106
See application file for complete search history.

(56) References Cited

U.S. PATENT DOCUMENTS

| | | | |
|---|---|---|---|
| 9,137,262 B2 | 9/2015 | Qureshi et al. | |
| 9,160,544 B2 | 10/2015 | Brophy et al. | |
| 9,609,460 B2 | 3/2017 | Sinha | |
| 9,930,530 B2* | 3/2018 | Patil | H04W 48/16 |
| 10,999,289 B2 | 5/2021 | Shah et al. | |
| 2014/0143374 A1* | 5/2014 | Huang | H04L 45/56 |
| | | | 709/217 |
| 2018/0234260 A1 | 8/2018 | McLaughlin et al. | |
| 2019/0356696 A1 | 11/2019 | Rojas et al. | |
| 2020/0382615 A1* | 12/2020 | Lifshitz | H04L 12/4633 |
| 2021/0194932 A1 | 6/2021 | Hill | |
| 2024/0163300 A1* | 5/2024 | Kumar | H04L 63/205 |

OTHER PUBLICATIONS

"IEC 62443", online: https://en.wikipedia.org/wiki/IEC_62443, Sep. 2, 2022, accessed Sep. 16, 2022, 5 pages, Wikimedia Foundation, Inc.

Schick, Charlie, "How IIoT and the Cloud are Upending the Purdue Model in Manufacturing", online: https://owlcyberdefense.com/blog/how-iiot-and-the-cloud-are-upending-the-purdue-model-in-manufacturing/, Sep. 11, 2019, accessed Sep. 19, 2022, 5 pages, Owl Cyber Defense.

"Industrial communication networks—Network and system security—Part 3-3: System security requirements and security levels", International Standard, IEC 62443-3-3, Edition 1.0, Aug. 2013, 14 pages, International Electrotechnical Commission.

"IEC 62443 and Isasecure Certification Applicability to Building Control Systems", Report from the Isasecure Building Control Systems Cyber Security Working Group Draft 0.8, Jan. 16, 2017, 48 pages, ISA Security Compliance Institute.

Byres, Eric, "Using ISA/IEC 62443 Standards to Improve Control System Security", White Paper, Version 1.2, May 2014, 12 pages, Tofino Security.

"Secure Substation Declaration of Security Conformance IEC 62443-3-3", IEC 62443-3-3 Security Requirements, v1.00 Manual, Feb. 2020, 31 pages, Siemens.

Day, et al., "Bounding the router table size in an ISP network using RINA", 2011 International Conference on the Network of the Future, Nov. 2011, 5 pages, IEEE.

"Mobile Device Management for Cloud Security", online: https://www.cloudcodes.com/, accessed Jul. 19, 2022, 7 pages, CloudCodes.

* cited by examiner

CLOUD-BASED SECURITY CONTROLS FOR MULTI-LEVEL HIERARCHAL EQUIPMENT ACCESS

TECHNICAL FIELD

The present disclosure relates generally to computer networks, and, more particularly, to cloud-based security controls for multi-level hierarchical equipment access.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another, such as an IoT motion sensor communicating with a smart lightbulb, to turn the lights on when a person enters a room. The IoT has also expanded to industrial settings as part of the so-called "Industrial IoT" (IIoT) to control manufacturing processes and other operations in industrial settings (e.g., factories, mines, oil rigs, etc.).

As devices are increasingly added to the IoT and IIOT, the number of external users and services that require access to them has also increased. For instance, a remote technician may wish to connect to a particular IoT device so that they can perform maintenance on it (e.g., updating its firmware, running diagnostics, etc.). While this is a relatively straightforward task in simple network deployments, many IoT and IIoT deployments are multi-layered. Thus, configuring a secure connection between an external client and a particular device also requires configuring the connection to span multiple layers of a given network. For instance, in the context of a factory, the remote connection may need to span an enterprise zone, a demilitarized zone (DMZ), an industrial zone, or the like. Simply exposing the target device to the Internet would also present a significant security risk, potentially allowing malicious entities to take control over the device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device determines a hierarchy of layers of a network comprising a plurality of networking devices. The device configures, in response to a request by a client to access remotely a particular endpoint in the network, a proxy chain of remote access agents executed by a plurality of networking devices in the network to allow the client to access remotely the particular endpoint. Each of those networking devices proxies traffic between different layers of the hierarchy. The device determines an access policy for the particular endpoint indicative of which commands may be sent to the particular endpoint by the client, based in part on where the particular endpoint is in the hierarchy. The device controls, based on the access policy, whether a command sent by the client is transmitted via the proxy chain to the particular endpoint.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Figure 1:
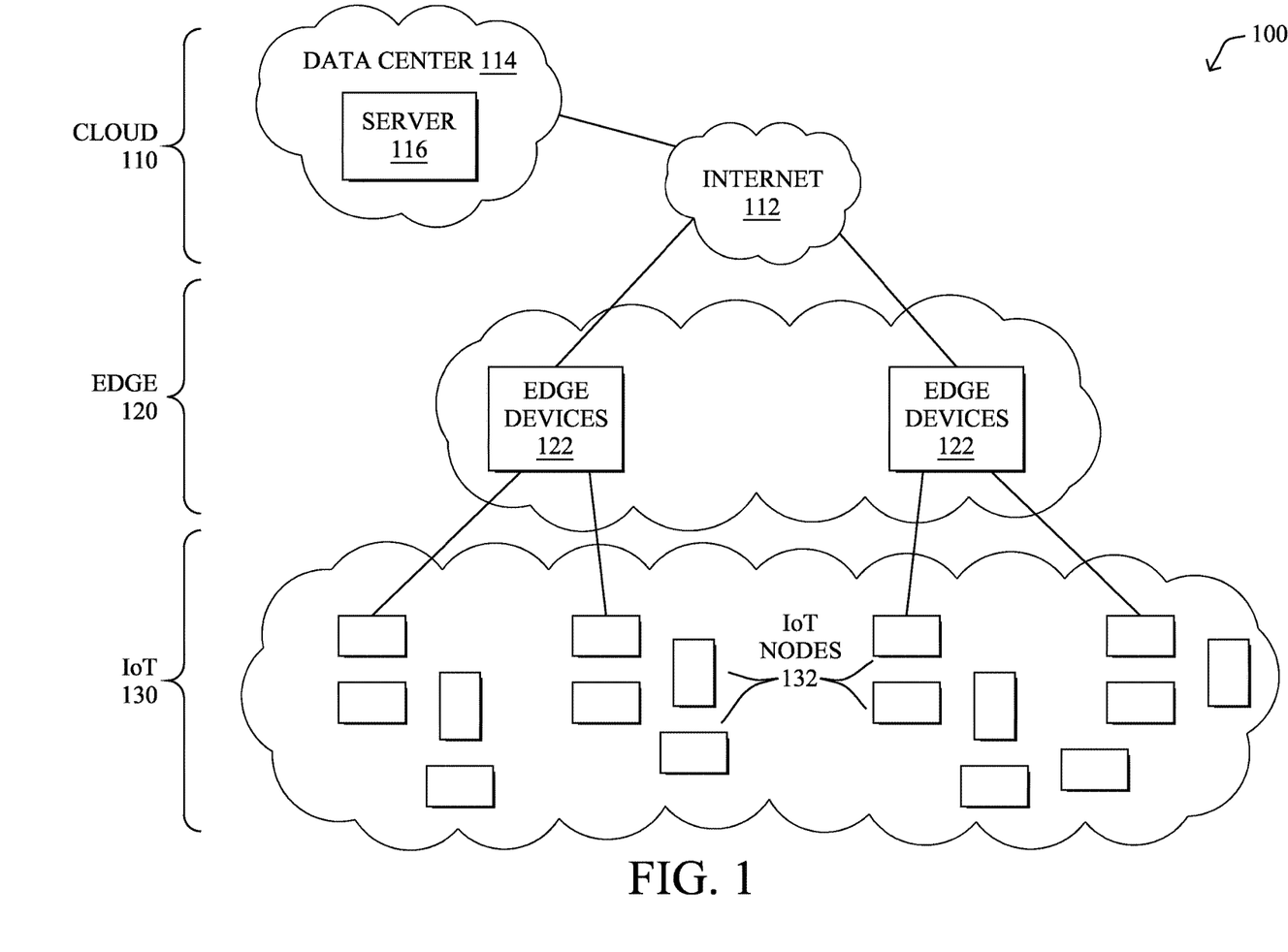
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
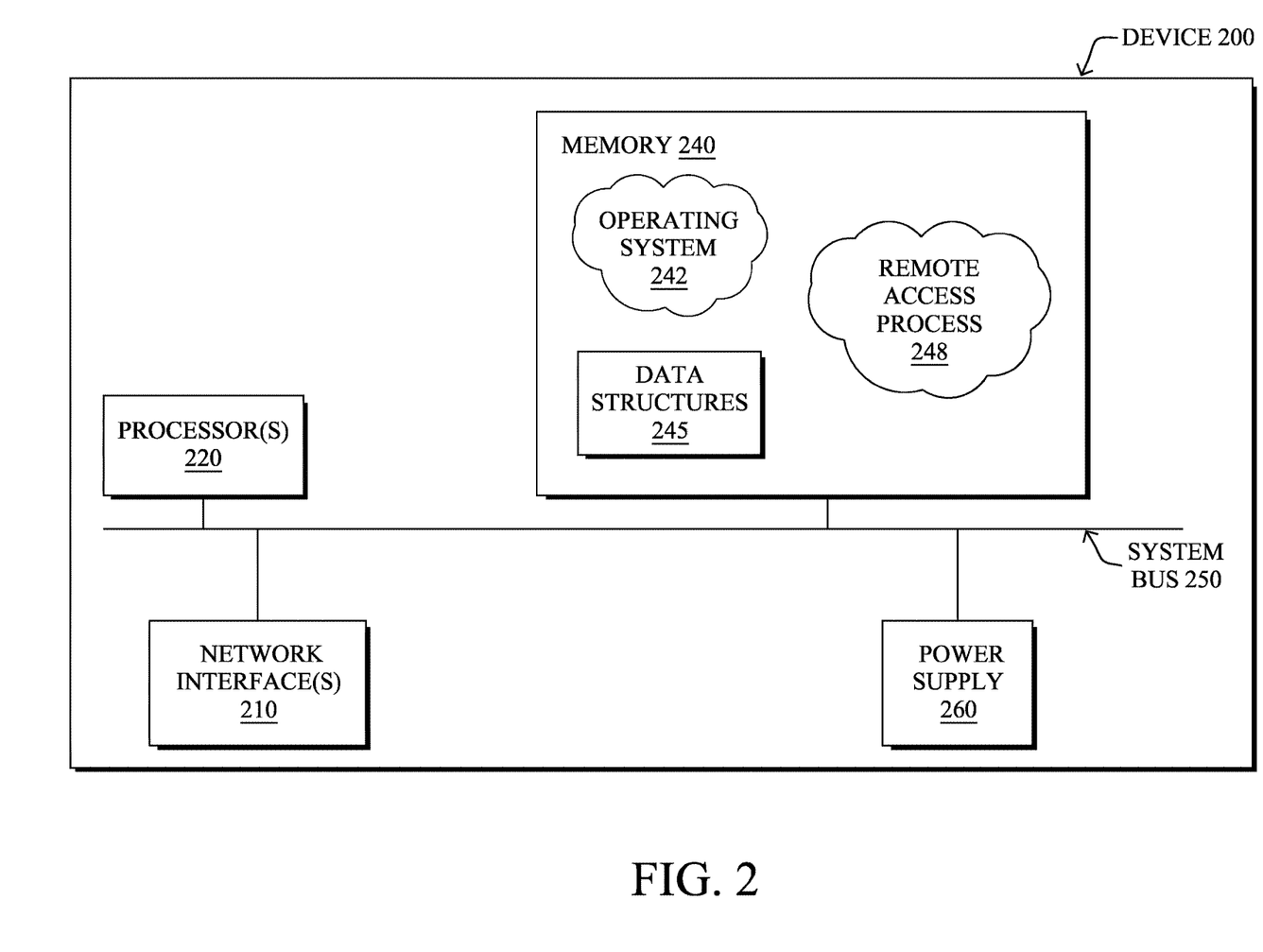
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative remote access process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many industrial IoT (IIoT)/operations technology (OT) networks are now deployed using a 'cookie-cutter' approach whereby discrete manufacturing or other control segments are deployed using duplicate IP addresses. In other words, the network may comprise a plurality of units, such as cells, zones, bays, etc., with addresses being repeated across units. As a result, different devices may belong to overlapping subnets. In addition, these devices may be located behind one or more firewalls and/or network address translation (NAT) devices.

Figure 3:
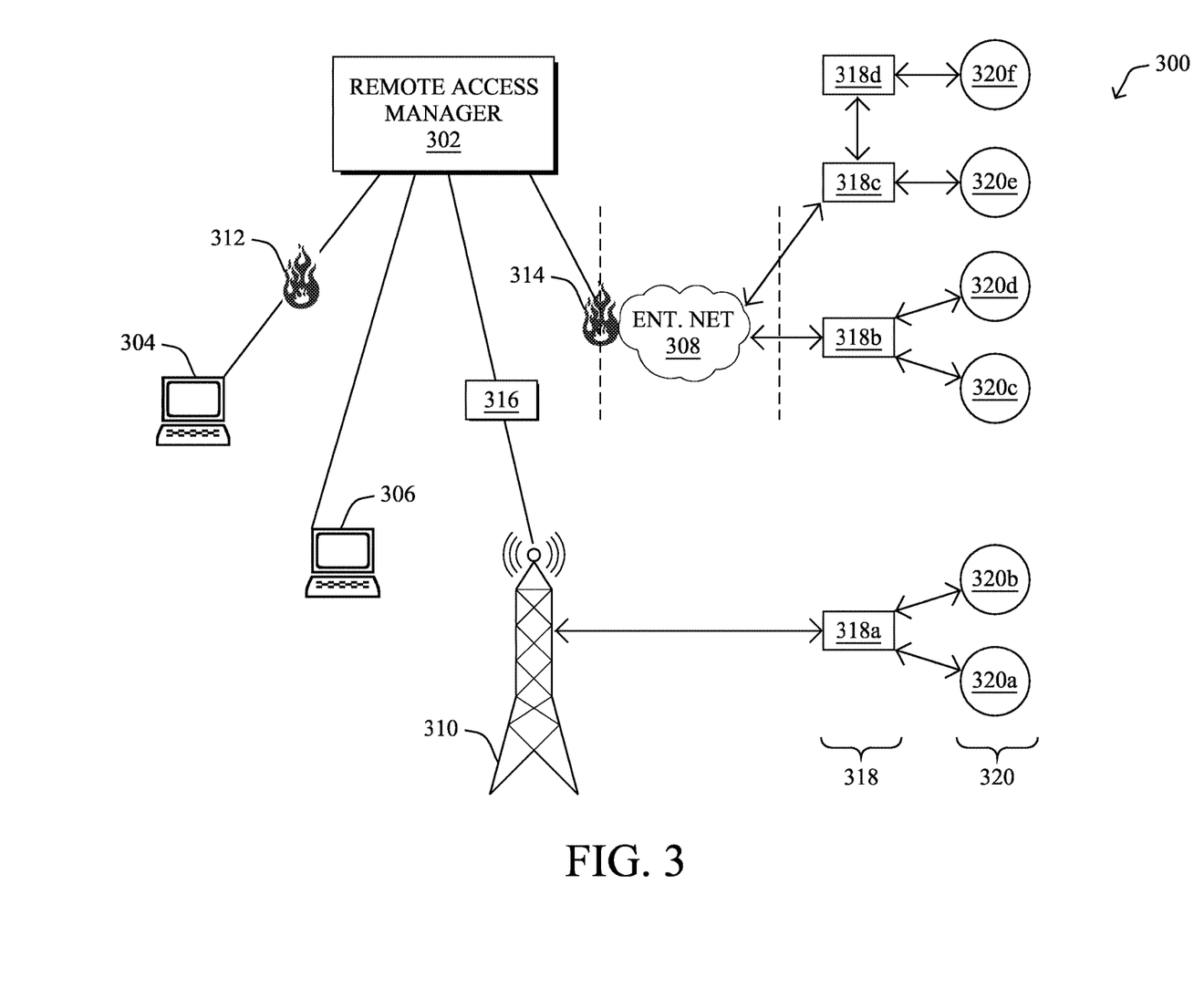
FIG. 3 illustrates an example of a remote access manager configuring remote access to an endpoint in a network.

By way of example, FIG. 3 illustrates an example 300 of a remote access manager 302 being used to configure remote access to an endpoint device in a network, according to various embodiments. As shown, assume that there are various endpoint IIOT devices 320 that are on a local network of a particular location, such as a factory, warehouse, or the like. In addition, assume that any or all of devices 320 each execute their own web application servers, allowing a technician to perform various functions such as reviewing diagnostic information, making configuration changes, and the like.

For instance, devices 320a-320b may be behind gateway 318a, which utilizes a cellular connection with a cell tower 310 and is behind NAT 316. Devices 320c-320d are behind gateway 318b, which is connected to an enterprise network 308 and behind a firewall 314. Likewise, device 320f is behind gateway 318d. Gateway 318d and device 320e are both behind gateway 318c, which is also connected to enterprise network 308 and behind firewall 314.

Remotely accessing the application web server of a particular device 320 is quite challenging under normal circumstances. For instance, assume that the user of client device 304 wishes to access the web server of device 320b. To enable such a connection, a remote access manager 302 may configure the various networking devices between client device 304 and device 320b, according to various embodiments.

While it is a relatively straightforward task for remote access manager 302 to configure a remote access connection in simple network deployments, many IoT and IIoT deployments are multi-layered. Thus, configuring a secure connection between an external client and a particular device also requires configuring the connection to span multiple layers of a given network. For instance, in the context of a factory, the remote connection may need to span an enterprise zone, a demilitarized zone (DMZ), an industrial zone, or the like. Simply exposing the target device to the Internet would also present a significant security risk, potentially allowing malicious entities to take control over the device.

Multi-Layered Secure Equipment Access

The techniques introduced herein allow for the secure remote access to endpoint devices located in multi-layered networks. In some aspects, a discovery mechanism is used herein to discover those networking devices in the multi-layered network that are capable of configuring an external connection to an endpoint in the network. By discovering the interrelations between such networking devices, the hierarchy of the network layers can be determined and used to configure a proxy chain between selected networking devices, to allow an external client access to a specific endpoint in the network.

Figure 4A:
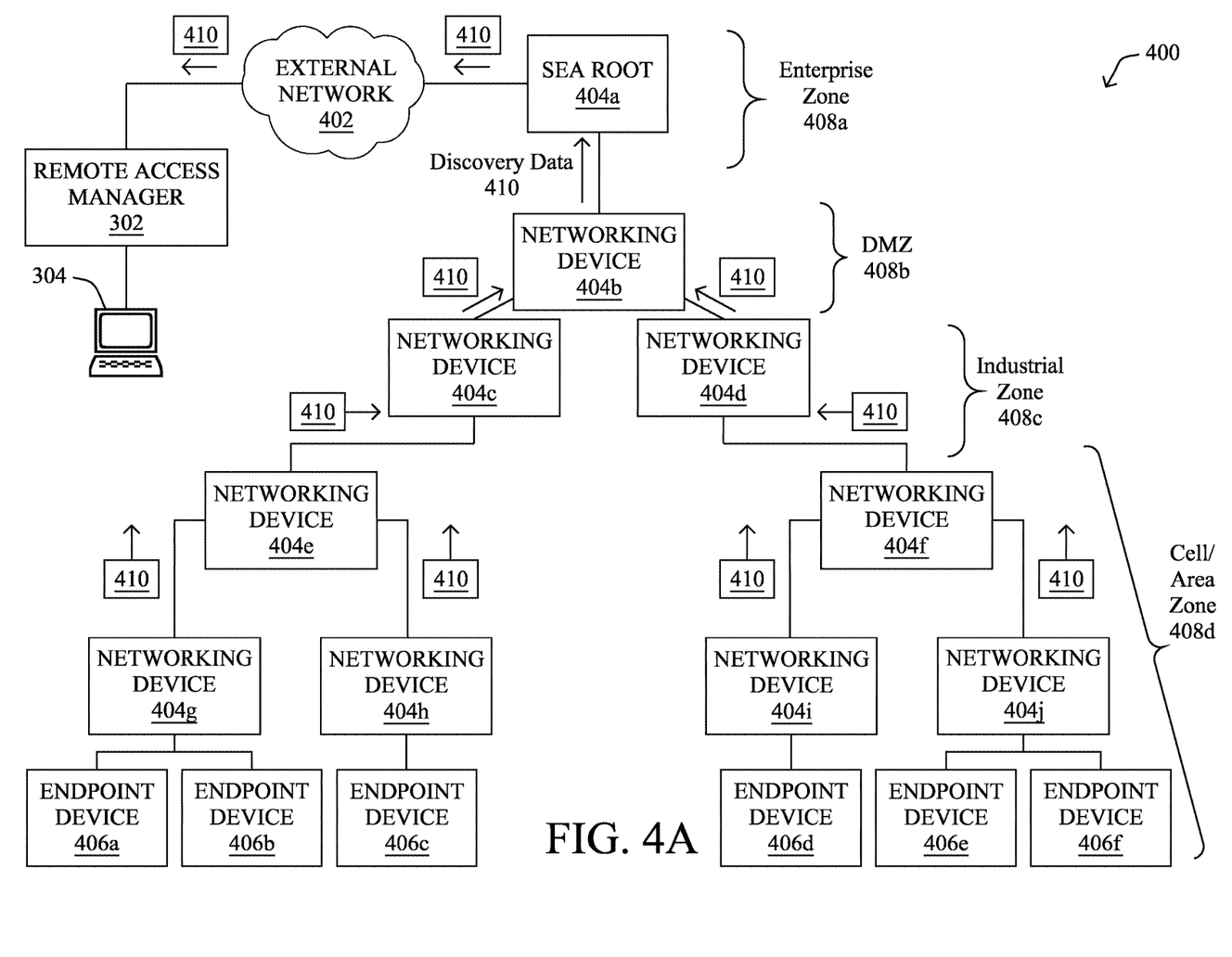
FIGS. 4A-4C illustrate an example of multi-layered secure equipment access.
Figure 4B:
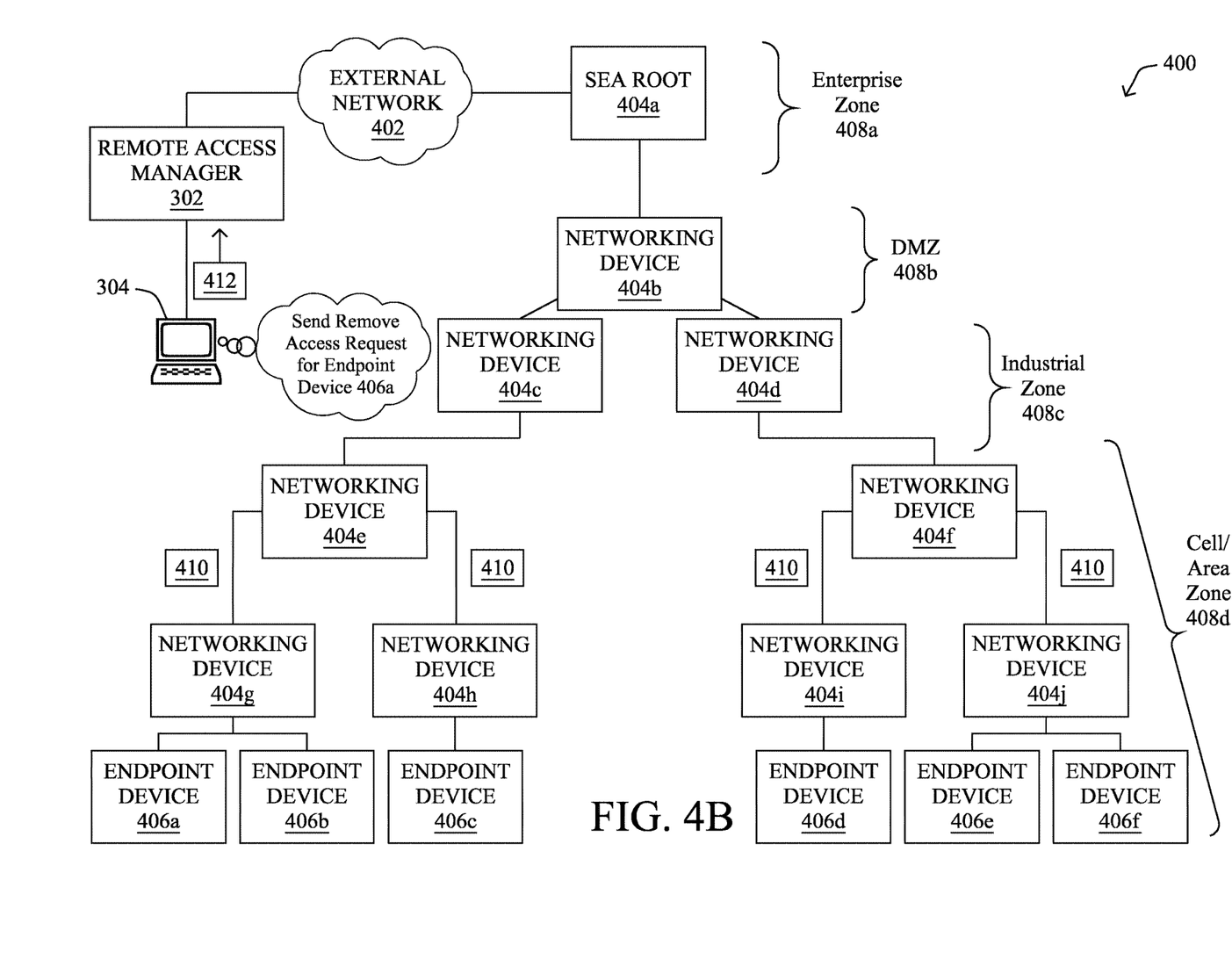
Figure 4C:
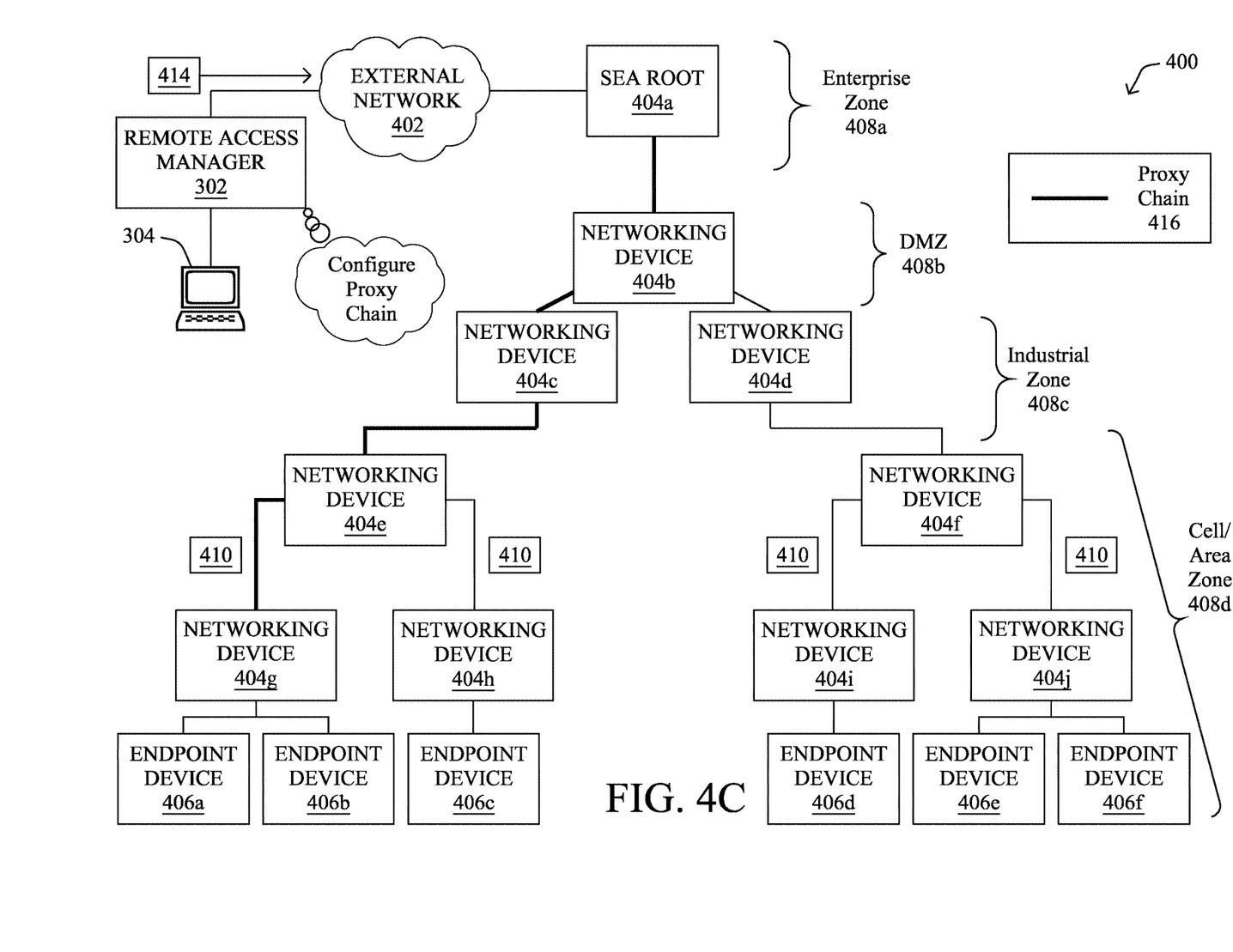

Operationally, FIGS. 4A-4C illustrate an example of multi-layered secure equipment access, according to various embodiments. As noted previously, many IoT and IIoT networks are multi-layered in nature. This is done primarily to create layers of security for different portions of a network. For instance, consider the case of a factory having industrial machinery that is controlled via programmable logic controllers (PLCs) that are on the local network. In addition, the factory may also include a number of offices in which users operate personal computers on the local network, to perform their daily tasks. As would be appreciated, these personal computers likely require access to the Internet, to allow their users to perform their daily tasks. However, exposing the PLCs in the same way to the Internet could very well lead to a malicious entity infiltrating them and causing physical damage to their associated machinery (e.g., by burning out a motor, etc.).

Many networks today are implemented in accordance with the International Electrotechnical Commission (IEC) 62443, which is a collection of cybersecurity standards to protect industrial networks. This collection of standards is closely related to the Purdue model, which originated in the early 1990s at Purdue University, with the goal of providing security to networks that include both operations technology (OT) and information technology (IT) networks, as in the above example of a factory. Under the Purdue model, the overall network is segmented into hierarchical layers, with enterprise and business layers existing at the top of the model. These layers primarily support the networking of servers, personal computers, and other IT-related devices. Below these layers is a demilitarized zone (DMZ) layer that exists as the boundary between the IT and OT portions of the network. Lower layers of the hierarchy of the DMZ layer thus include the OT devices of the network and the networking devices that support them. As would be appreciated, other standards or networking models may also be compatible with the techniques herein, so long as the network is organized into a multi-layered topology from a security perspective, in further embodiments.

By way of illustration, consider example 400 in FIG. 4A of a local network comprising any number of networking devices 404. These networking devices 404 (e.g., devices 404a-404j) may be deployed in accordance with IEC 62443 so as to define a plurality of layers 408, such as any or all or the following:

Enterprise Zone Layer 408a—this layer may support the various IT endpoints and IT functions for the network, as well as connect the local network to an external network 402, such as the Internet, or the like.

DMZ layer 408b—this layer primarily serves as a divider between the IT portions of the local network and its OT portions. For instance, in the case of a factory, DMZ layer 408b may exist between the personal computers in the offices of the factory and the OT components of the factory, such as its PLCs and networking devices that support the manufacturing equipment therein.

Industrial Zone Layer 408c—this layer may serve as the top layer for the OT portions of the network, thereby connecting any of the lower layer(s) of the OT portions of the network together (i.e., cell/area zones).

Cell/Area Zone Layer 408d—this layer may include different groups of OT devices that have been grouped together into cells/areas. For instance, consider the case in which a factory includes five bays, each of which houses the same type of manufacturing equipment. In such a case, each of these bays may be deployed as separate cells/areas from a networking perspective and implement their own networking policies. In many instances, such cells, bays, etc., may be deployed using a 'cookie-cutter' approach, often by using duplicate IP addresses and overlapping subnets, for easy of deployment.

A key aspect of implementing a multi-layered network is that a different networking policy may be implemented at each layer. For instance, assume that endpoint devices 406a-406f are arranged within different cells. In such a case, the network policies implemented within layer 408d may prevent one endpoint device 406 from communicating with another endpoint device 406 outside of its own cell. For instance, the networking policy may prevent endpoint device 406a from communicating with endpoint device 406f, as shown in FIG. 4A.

Typically, such networking policies associated with the different layers 408 of the network may restrict the set of devices with which a particular device may communicate, the type of traffic that it may send or receive, the protocols that it may use for its communications, the types of actions that may be performed, etc. These networking policies are typically most restrictive at the lowest layer of the network (e.g., layer 408d), with the highest layer having the least restrictive policy (e.g., layer 408a). For instance, while endpoint device 406a may be prevented from communicating with other endpoints within layer 408d, endpoint devices within layer 408a (e.g., personal computers, etc.) may not have the same restrictions and may even be able to communicate via external network 402.

According to various embodiments, any or all of the networking devices 404 within the network may be configured to support the establishment of a connection between an external client, such as client device 304, and an endpoint device in the network, such as endpoint device 406a. In general, these networking devices 404 may execute specialized software to discover one another and effect the formation of such a connection. For instance, such software (e.g., remote access process 248) may take the form of an agent executed by the networking device 404, functionality built into the operating system of the networking devices 404, or the like.

In addition to automatically discovering those networking devices 404 that can aid in configuring a remote connection between an endpoint device 406 and with an external client, another key functionality of these devices is the formation of a proxy chain across the different layers 408 of the network, in order to support the connection. More specifically, since the networking policies associated with the different layers 408 would normally prevent such a connection from being formed, certain ones of the networking devices 404 may act as proxies that convey the traffic between different layers 408 (e.g., through the formation of one or more tunnels along the proxy chain).

As an initial step, the networking devices 404 that are capable of assisting in the formation of an external/remote connection to an endpoint device in the network (e.g., any of endpoint devices 406) may utilize a discovery protocol to automatically discover other capable networking devices 404. Such networking devices 404 may also be configured with contextual details of their locations in the network (e.g., their specific layer 408, which cell/zone they are in, etc.), so that their generated discovery data 410 can be used to map the topology of these networking devices in the network across the different layers 408.

Thus, in some embodiments, networking devices 404 in the network that are capable of supporting an external connection via a proxy chain may generate and send discovery data 410 throughout the network, which may be collected by a designated 'root' networking device. For instance, as shown, the root networking device may be networking device 404a, as it is directly accessible from external network 402, such as the Internet. In one embodiment, the root networking device 404a may advertise itself as a root to other networking devices 404 in the network using a custom message that is understandable by any other networking device 404 also configured to support external/remote connections into the network. In turn, a receiving networking device 404 able to understand the discovery advertisement may return its discovery data 410 in response, as well as send the discovery advertisement onward to its children, which repeat the process, to promulgate their generated discovery data 410 back towards networking device 404a. Of course, the collection of discovery data 410 may be performed on a pull basis or push basis (e.g., sent periodically, etc.), in various embodiments.

For example, networking device 404a may advertise itself as a root via a custom message using a Layer 2 discovery protocol, such as the Cisco Discovery Protocol (CDP), Link Layer Discovery Protocol (LLDP), or other suitable protocol. Any receiving networking device 404 may then respond with its their generated discovery data 410, indicative of its location in the network or other context information.

In various embodiments, the discovery data 410 may then be sent to remote access manager 302 and used to compute a topology graph of those responding networking devices 404, thereby learning the hierarchy of layers 408 of the network and the networking devices 404 that can support a proxy chain for an external connection. It should be noted that while remote access manager 302 is shown located externally to that of the local network in which networking devices 404 reside, further embodiments provide for some or all of its functionality described herein to be integrated with one or more devices in the network (e.g., networking device 404a, etc.). In addition, as would be appreciated, remote access manager 302 may be implemented using one or more specifically configured devices (e.g., device 200), the collection of which may be viewed as a singular executing device for purposes of the teachings herein.

Through this discovery mechanism, remote access manager 302 will now have information regarding the different layers 408 of the network, their constituent networking devices 404 that are capable of supporting an external connection via a proxy chain, their attached endpoints or other devices, their corresponding security policies, other contextual information, or the like. Note also that such information may be formatted in various ways, without deviating from the teachings herein. For instance, each responding networking devices 404 may be identified using a naming mechanism that also identifies its location in the network (e.g., "SAEGW-xyz@cell-3-zone2.acme.com").

Now, assume that client device 304 wishes to remotely access endpoint device 406a, deep within the network. In such a case, client device 304 may send a request 412 to remote access manager 302, thereby requesting that an external connection be formed. In other embodiments, a similar approach could also be used by an administrator to request that remote access manager 302 configure an external connection between endpoint device 406a and some other external entity.

Regardless of the origin of request 412, remote access manager 302 may use its knowledge of the network to select networking devices 404 from among those discovered, to form a proxy chain in the network. For instance, in the case of endpoint device 406a, remote access manager 302 may identify networking devices 404g, 404e, 404c, 404b, and 404a as those needed to proxy the traffic throughout the network. Indeed, a key security aspect of many multi-leveled security models mandates that any given networking device can only communicate with one layer 408 below itself, not multiple levels. This means that a selected networking device 404 along the proxy chain may send traffic from one of its adjacent layers 408 to another adjacent layer 408, thereby getting around this restriction.

As shown in FIG. 4C, in response to request 412, remote access manager 302 may the send out instructions 414 that configure a specific proxy chain 416 within the network to support an external/remote connection between client device 304 and endpoint device 406a. In various embodiments, instructions 414 may instruct the networking devices 404 that are to make up proxy chain 416 regarding the specific hop-by-hop connections and security parameters required. For instance, in some embodiments, only certain types of application protocols (e.g., HTTPS, gRPC, etc.) may be used by the traffic conveyed via proxy chain 416. In addition, configuration of proxy chain 416 may also entail configuring any firewalls, NATs, etc. along the path, to support the external connection.

The result of the above approach is that proxy chain 416 can now be used to convey traffic through the various layers 408 of the network as part of an external/remote connection between endpoint device 406a and client device 304, but in a manner that still conforms with the security requirements of IEC 62443 and other multi-layered network security models. Indeed, proxy chain 416 may still prevent any direct communication between industrial zone layer 408c and enterprise zone layer 408a, requiring all such communications to go through DMZ layer 408b.

With the above techniques, it is now possible to gain management access to devices deep within an OT network, which may be organized into a hierarchy of layers (e.g., per the Purdue model), thereby dividing the network into cells and zones based on a combination of functions and security requirement (e.g., per IEC 62443), and communication between the cells/zones is done via conduits. Per the IEC 62443 definition:

Zones consist of the grouping of cyber assets that share the same cybersecurity requirements Conduits consist of the grouping of cyber assets dedicated exclusively to communications, and which share the same cybersecurity requirements Different cells and zones have different security requirements depending on the acceptable risk level and correspondingly have an associated Security Level (SL) from 1-4. The actual security achieved for devices in a given cell or zone depends on the device itself, as well as the surrounding security equipment (e.g. a firewall), which may be provided by a conduit for the cell/zone, for instance. Note that a conduit under IEC 62443 cannot traverse more than one zone.

Thus, different parts of the OT network (as per IEC 62443) have different security requirements and associated controls, preventing actions in some cells/zones that may be allowed in other cells/zones. As a simple example, consider IEC 62443 FR 1 (Identification and Authentication Control):

Security Level 1 (SL 1) simply requires protection against casual or coincidental access by unauthenticated entities, whereas Security Level 4 (SL 4) requires protection against intentional unauthenticated access by entities using sophisticated means with extended resources, Industrial Automation and Control Systems (IACS) specific skills and high motivation.

Furthermore, the specific use case can significantly affect the security required. For instance, a PLC controlling a paint mixer in a factory may have very different requirements than a PLC controlling equipment in a nuclear power plant.

Thus, when accessing equipment in various cells, zones, etc. from a cloud portal such via a remote access manager, it is necessary to first understand what the permissible management policy is in each cell/zone, for each type of device, and/or for each type of user. Once this is understood, the resulting policy may be translated into a set of allowed management operations and commands that the user may issue, and finally, this must be enforced at the cloud gateway portal, providing the correct level of management access control depending on the unified policy.

Cloud-Based Security Controls for Multi-Level Hierarchical Equipment Access

The techniques herein allow for the implementation of a variable access policy for a remote session that is derived from the network topology (e.g., the cell, zone, or other layer in which the target endpoint is located), the type of equipment being accessed, and/or the type of user seeking remote access. In some aspects, the resulting policy may be enforced so as to only allow certain commands to be passed to the endpoint via the proxy chain set up to the endpoint so as to allow remote access thereto.

Illustratively, the techniques described herein may be performed by hardware, software, and/or firmware, such as in accordance with remote access process 248, which may include computer executable instructions executed by the processor 220 (or independent processor of interfaces 210) to perform functions relating to the techniques described herein.

Specifically, in various embodiments, a device determines a hierarchy of layers of a network comprising a plurality of networking devices. The device configures, in response to a request by a client to access remotely a particular endpoint in the network, a proxy chain of remote access agents executed by a plurality of networking devices in the network to allow the client to access remotely the particular endpoint. Each of those networking devices proxies traffic between different layers of the hierarchy. The device determines an access policy for the particular endpoint indicative of which commands may be sent to the particular endpoint by the client, based in part on where the particular endpoint is in the hierarchy. The device controls, based on the access policy, whether a command sent by the client is transmitted via the proxy chain to the particular endpoint.

Figure 5A:
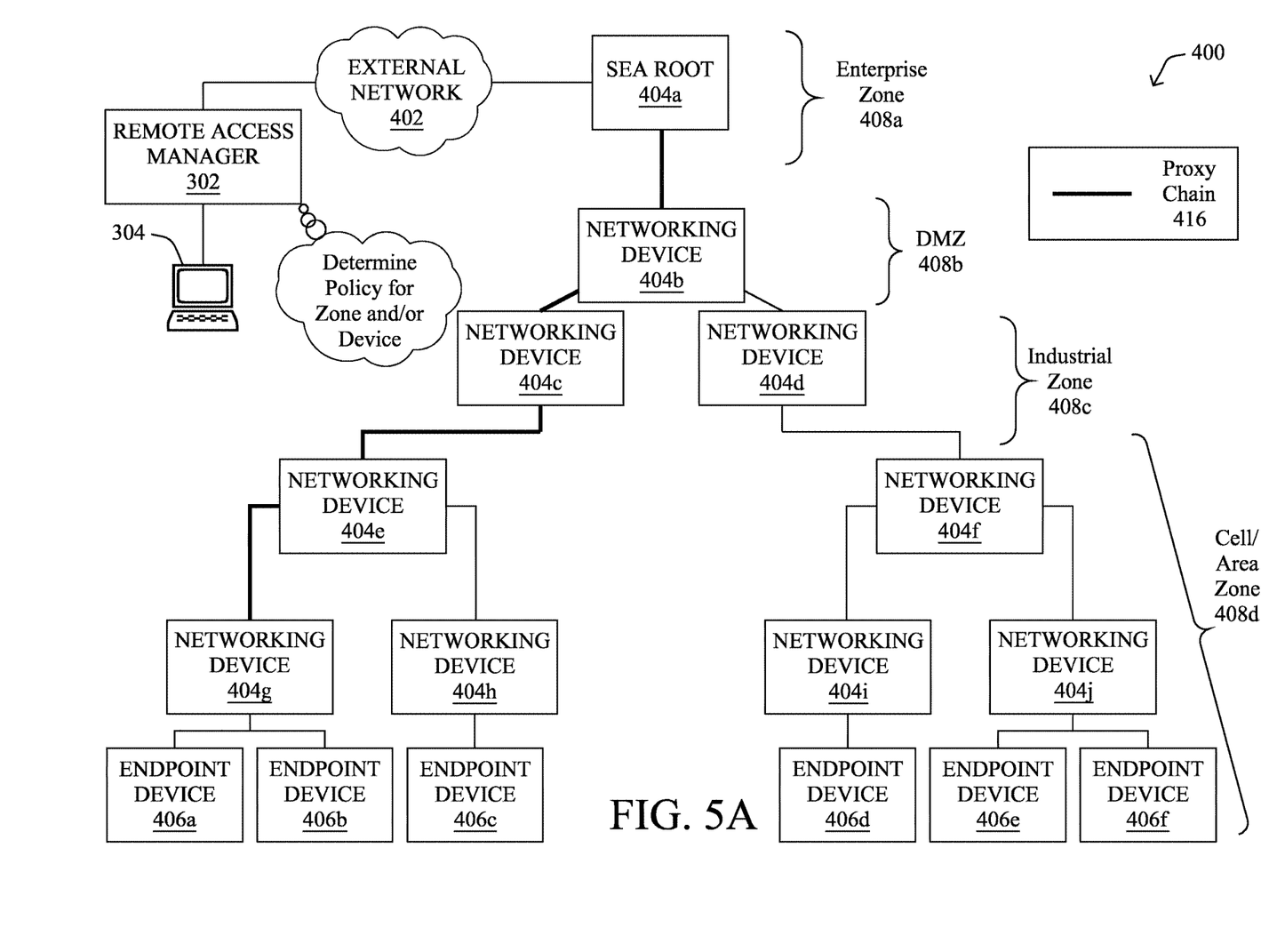
FIGS. 5A-5C illustrate an example of enforcing security controls in a multi-layered secure equipment access session.

Continuing the example of FIGS. 4A-4C, FIGS. 5A-5C illustrate an example of enforcing security controls in a multi-layered secure equipment access session, according to various embodiments. As shown in FIG. 5A, in addition to configuring a proxy chain 416 between client device 304 and an endpoint device, such as endpoint device 406a, remote access manager 302 may also determine an appropriate access policy that governs the remote access session between client device 304 and endpoint device 406a. More specifically, remote access manager 302 may determine the appropriate policy based on any or all of the following, in various embodiments:

1.) The location of endpoint device 406a (and/or any other endpoint devices 406 associated with the remote session) in the hierarchy of layers. For instance, a particular security policy may be associated with endpoint device 406a based on the IEC 62443 cell/area zone in which it is located.

2.) The type of device of endpoint device 406a. Indeed, even within the same cell/area zone, different types of devices may have different policies associated with them.

3.) The user associated with the remote access session with endpoint device 406a. More specifically, certain users may be restricted from issuing certain commands, potentially based on the location of the endpoint(s) involved in the session and/or their type(s). For instance, an access policy may cover not only the managed endpoint device 406, but also the accessing device (e.g., client device 304) and user per IEC 62443 (Requirements FR1-FR7), e.g., Identification and Authentication (FR1) and Use Control (FR2). Access to SL-4 level devices, for instance, may require that an administrator perform multifactor authentication (IEC 62443 Requirement SR 1.1) and that a second person is involved in making changes (IEC 62443 SR 2.1 Dual Approval).

Either before, during, or after remote access manager 302 establishes proxy chain 416 in response to a remote access request from client device 304, it may determine an appropriate access policy for the endpoint device(s) 406, based on any or all of the above factors, to govern the remote access session.

Note that as disclosed above, remote access manager 302 may discover the communication details of the various networking devices 404 in the network that can support the proxy chaining herein. As part of this discovery, the networking devices 404 will also discover endpoint devices 406 and include information about their contexts to 304 (e.g., the IEC 62443 level where a particular endpoint device 406 was discovered and its cell/area zone identifier). Remote access manager 302 can then use this information to perform a lookup of the policy or policies governing the endpoint device(s) 406 for a given remote access session and/or the networking device(s) 404 that support the proxy chain for the session.

By way of example, remote access manager 302 may retrieve policy data of the following form:

```
Contextual Policy:
    Devices in Zone 1 (the iDMZ)    allowed actions = a, b, c, d, e, f
    Devices in Zone 2a:             allowed actions = b, c, x, y
    Devices in Zone 2b:             allowed actions = c, x, y, z
    Devices in Zone 2c:             allowed actions = x, y, z
    Devices in Zone 3:              allowed actions = y, z
    Devices in Zone 3b:             allowed actions = c, y, z
    Devices in Zone 4:              allowed actions = x, y, z
Device Policy:
    Rockwell PLC ver25a             allowed actions = a, j, k, l, x, y, c
```

In some embodiments, remote access manager 302 may take a 'lowest common denominator' approach to determining the access policy to be applied with respect to the endpoint device(s) involved in a given remote access session. Such an approach may seek the set of allowed actions/commands that provide the most minimal privileges to the remote access client or user. Based on this, remote access manager 302 may determine a unique access policy for each remote session to the target endpoint device 406 (e.g., endpoint device 406a in FIG. 5A).

In various embodiments, the access policy generated by remote access manager 302 for a given remote access session may comprise a listing of allowed actions/commands that may be sent to the endpoint via the corresponding proxy chain for the session. For instance, such an access policy may specify whether a supervisory control and data acquisition (SCADA) command may be executed with respect to the endpoint, whether firmware of the endpoint can be upgraded via the remote session, etc. In some instances, the commands may comprise command line interface (CLI) commands that may be executed or command groupings that may be used on a per-endpoint (and/or per-user basis).

By way of example, assume that endpoint device 406a is located at Level 2, according to IEC 62443, within a cell/area zone. In such a case, the access policy determined by remote access manager 302 may disallow commands to be sent to endpoint device 406a via proxy chain 416 that instruct endpoint device 406a to communicate with another device at Levels 4, 5, or the Internet. However, if the endpoint device sits at the DMZ (e.g., DMZ layer 408b), commands instructing the endpoint to communicate with Levels 3, 4, or 5 may be allowed per policy. In another example, the policy determined by remote access manager 302 may restrict management-level commands to be sent to the endpoint device that instruct it to directly communicate between cell/area zones without going through a controlled conduit.

As would be appreciated, the access policy determined by remote access manager 302 may be unique to each endpoint device 406 in the network and/or user attempting to access it remotely, meaning that the policies will be dynamic in nature, depending on the device context and its location in the network. This is because an endpoint device may be moved around in an OT environment. Then, after the discovery is refreshed, it may be assigned a different policy, depending on its new location. This allows remote access manager 302 to generate granular policies no matter where the target endpoint device is, or who is accessing it.

Figure 5B:
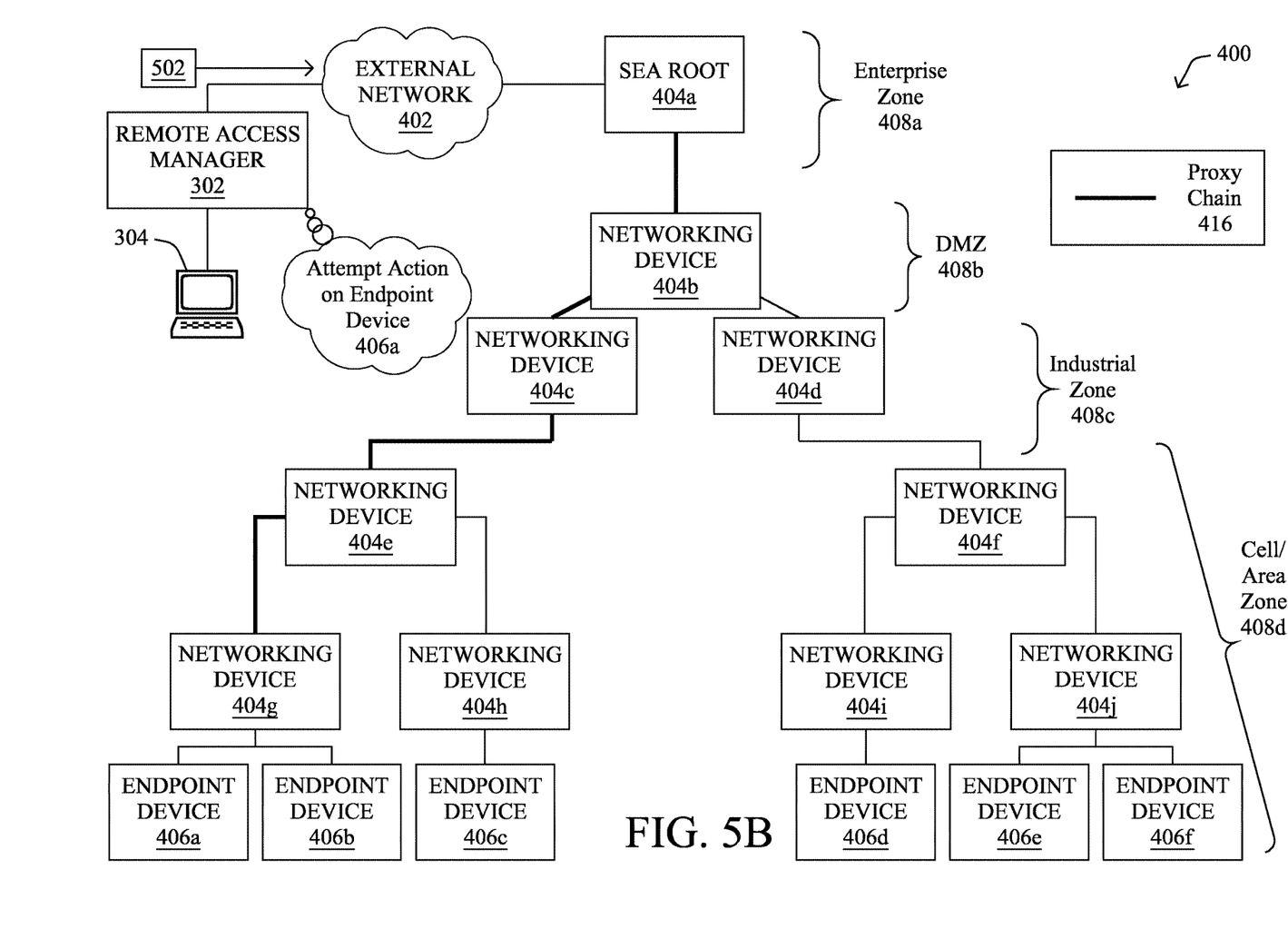

In terms of policy enforcement, now consider the instance in FIG. 5B of client device 304 sending a command 502 for endpoint device 406a via its remote access session. Such a command 502 may perform a specific action that may be either allowed or disallowed per the corresponding policy determined by remote access manager 302.

Figure 5C:
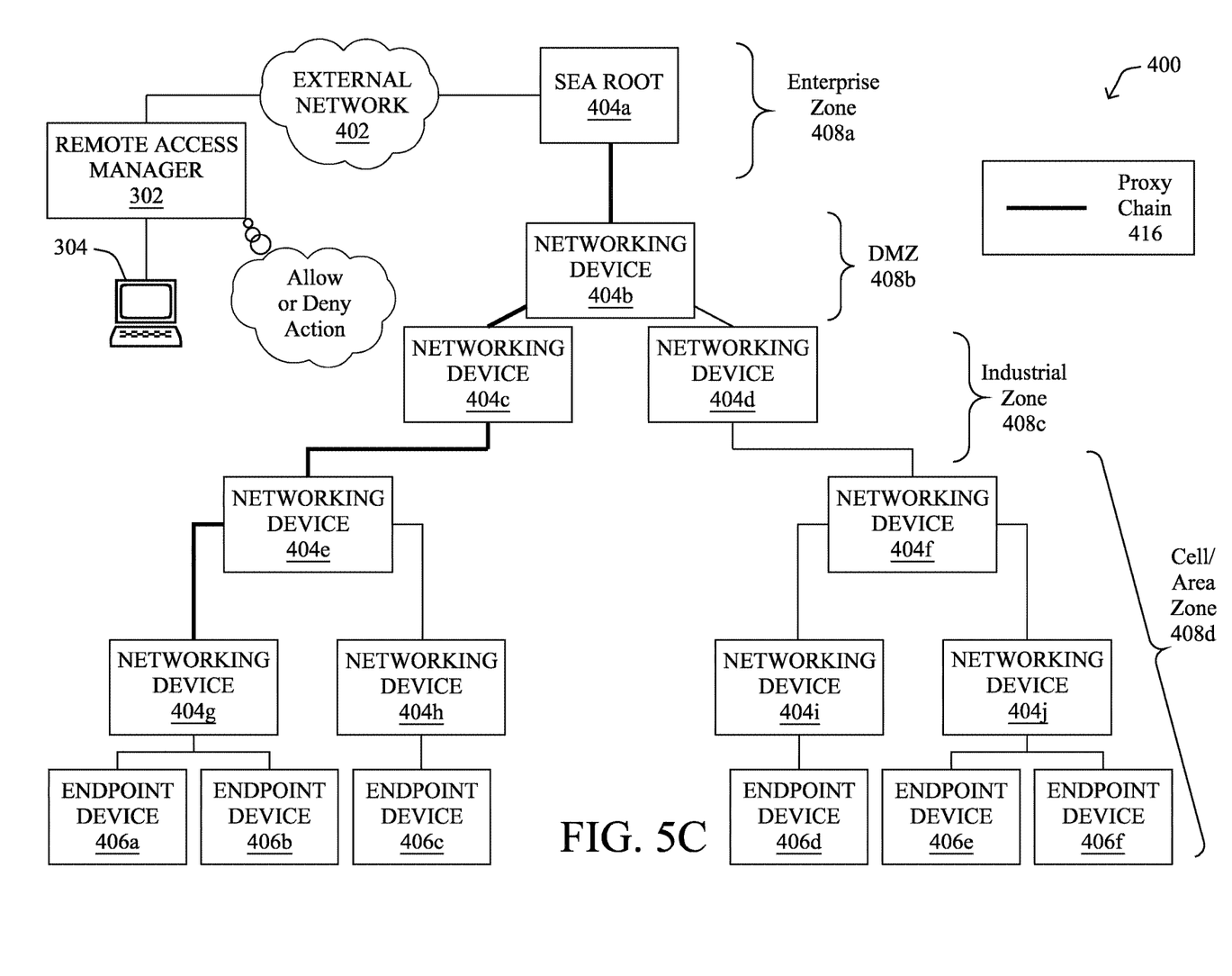

In such a case, as shown in FIG. 5C, remote access manager 302 may analyze the sent command and determine whether to convey command 502 onward via proxy chain 416 to endpoint device 406a. To do so, for instance, remote access manager 302 may perform packet inspection on the payload of the traffic (e.g., using deep packet inspection), provide an interface to client device 304 to issue such a command, or the like.

In instances in which command 502 complies with the access policy determined by remote access manager 302, remote access manager 302 may simply send command 502 onward into the local network and via proxy chain 416 to endpoint device 406a. However, if command 502 is in violation of the access policy, remote access manager 302 may take any number of corrective measures such as, but not limited to the following:

Blocking/preventing command 502 from being sent to endpoint device 406a

Sending an alert to a user interface of client device 304 indicating that the attempted command/action is now allowed per policy Sending an alert to a user interface of an administrator regarding the violation Etc.

In further embodiments, the functionalities of remote access manager 302 and/or client 304 may be implemented within the same network of the endpoint client, but at a different layer/level of the network. Indeed, while the techniques herein are well suited for establishing external access to an endpoint device 406, the can also be implemented to establish a proxy chain across different layers/levels, to allow the client to access the target endpoint. In this instance, the client is "remote" from the endpoint in the sense that it is otherwise prevented from being able to access the endpoint without first going through the remote access manager. For example, a technician in the office of a factory could still utilize the techniques herein to access a particular PLC or other endpoint on the factory floor.

Figure 6:
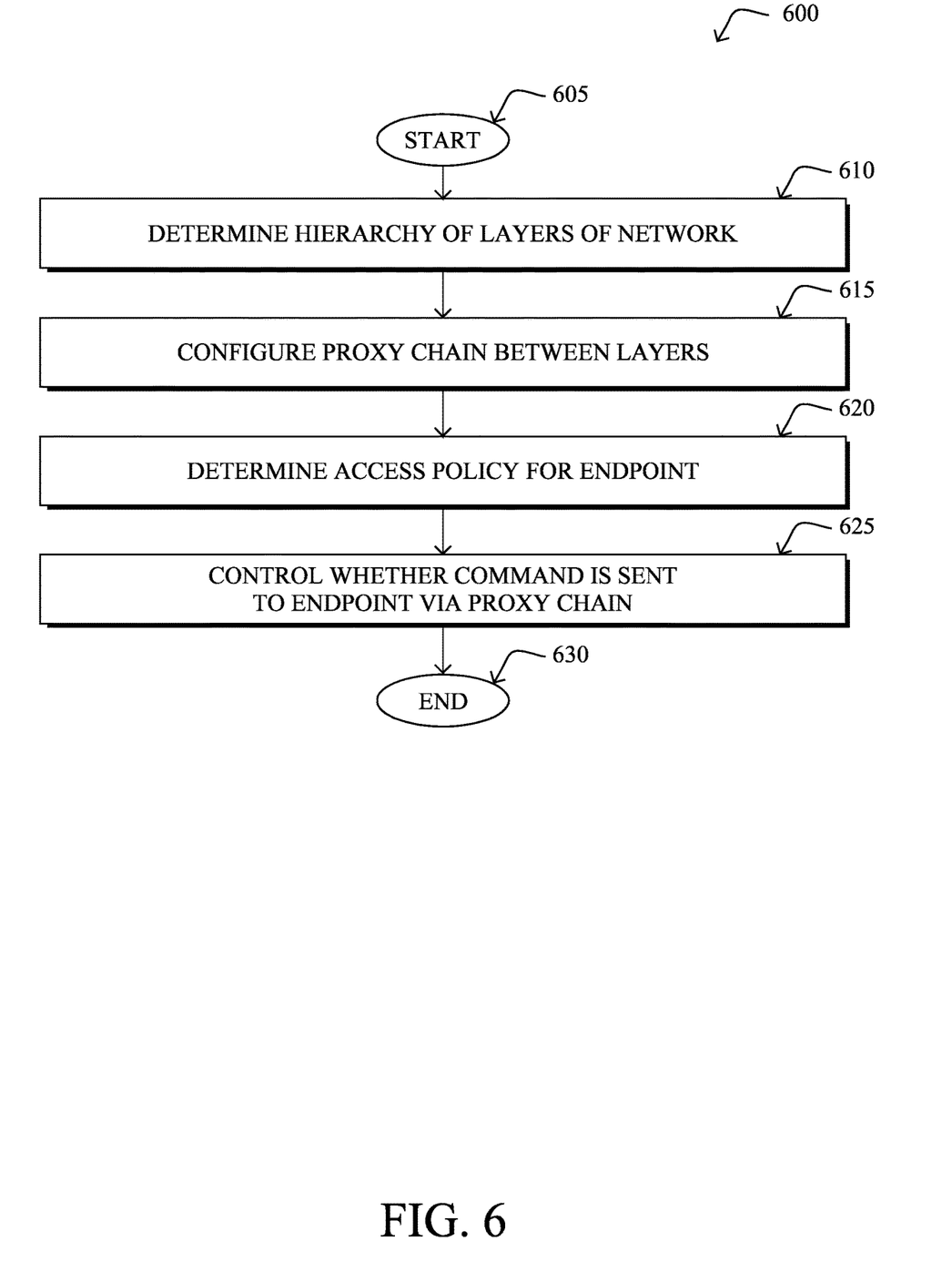
FIG. 6 illustrates an example simplified procedure for providing multi-layered secure equipment access.

FIG. 6 illustrates an example simplified procedure for cloud-based security controls for multi-level hierarchical equipment access, in accordance with one or more embodiments described herein. For example, a remote access manager, which may take the form of a non-generic, specifically configured device (e.g., device 200), may perform procedure 600 by executing stored instructions (e.g., remote access process 248). The procedure 600 may start at step 605, and continues to step 610, where, as described in greater detail above, the device may determine a hierarchy of layers of a network comprising a plurality of networking devices. In some embodiments, the layers of the network represent different IEC 62443 zones. In various embodiments, at least one of the layers of the network comprises a demilitarized zone (DMZ). In further embodiments, the plurality of networking devices comprises one or more routers or switches.

At step 615, as detailed above, the device may configure a proxy chain of remote access agents executed by a plurality of networking devices in the network to allow the client to access remotely the particular endpoint, each of those networking devices proxying traffic between different layers of the hierarchy. In various embodiments, the device may do so in response to a request by a client to access remotely a particular endpoint in the network.

At step 620, the device may determine an access policy for the particular endpoint indicative of which commands may be sent to the particular endpoint by the client, based in part on where the particular endpoint is in the hierarchy, as described in greater detail above. In some embodiments, the device determines the access policy based in part on an identity of a user associated with the request. In a further embodiment, the device determines the access policy based further in part on the particular endpoint. In yet an additional embodiment, the device may determine the access policy by determining a set of allowed commands with minimal privileges selected from among one or more of: a policy associated with a type of the particular endpoint and a policy associated with a layer in the hierarchy.

At step 625, as detailed above, the device may control, based on the access policy, whether a command sent by the client is transmitted via the proxy chain to the particular endpoint. In one embodiment, the device may do so by blocking traffic conveying the command from being transmitted via the proxy chain. In another embodiment, the device may also provide an indication to the client that the command was blocked.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for cloud-based security controls for multi-level hierarchical equipment access, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   determining, by a device, a hierarchy of layers of a network comprising a plurality of networking devices;
   configuring, by the device and in response to a request by a client to access remotely a particular endpoint in the network, a proxy chain of remote access agents executed by a plurality of networking devices in the network to allow the client to access remotely the particular endpoint, each of those networking devices proxying traffic between different layers of the hierarchy;
   determining, by the device, an access policy for the particular endpoint indicative of which commands may be sent to the particular endpoint by the client, based in part on where the particular endpoint is in the hierarchy; and
   controlling, by the device and based on the access policy, whether a command sent by the client is transmitted via the proxy chain to the particular endpoint.

2. The method as in claim 1, wherein the layers of the network represent different IEC 62443 zones.

3. The method as in claim 1, wherein at least one of the layers of the network comprises a demilitarized zone (DMZ).

4. The method as in claim 1, wherein the device determines the access policy based in part on an identity of a user associated with the request.

5. The method as in claim 4, wherein the device determines the access policy based further in part on the particular endpoint.

6. The method as in claim 1, wherein determining the access policy for the particular endpoint comprises:
   determining a set of allowed commands with minimal privileges selected from among one or more of: a policy associated with a type of the particular endpoint and a policy associated with a layer in the hierarchy.

7. The method as in claim 1, wherein controlling whether the command sent by the client is transmitted via the proxy chain to the particular endpoint comprises:
   blocking traffic conveying the command from being transmitted via the proxy chain.

8. The method as in claim 7, further comprising:
   providing an indication to the client that the command was blocked.

9. The method as in claim 1, further comprising:
   providing, by the device, visual indicia of the plurality of networking devices and the hierarchy of layers of the network for display.

10. The method as in claim 1, wherein the plurality of networking devices comprises one or more routers or switches.

11. An apparatus, comprising:
    one or more network interfaces;
    a processor coupled to the one or more network interfaces and configured to execute one or more processes; and a memory configured to store a process that is executable by the processor, the process when executed configured to:
  determine a hierarchy of layers of a network comprising a plurality of networking devices;
  configure, in response to a request by a client to access remotely a particular endpoint in the network, a proxy chain of remote access agents executed by a plurality of networking devices in the network to allow the client to access remotely the particular endpoint, each of those networking devices proxying traffic between different layers of the hierarchy;
  determine an access policy for the particular endpoint indicative of which commands may be sent to the particular endpoint by the client, based in part on where the particular endpoint is in the hierarchy; and
  control, based on the access policy, whether a command sent by the client is transmitted via the proxy chain to the particular endpoint.

12. The apparatus as in claim 11, wherein the layers of the network represent different IEC 62443 zones.

13. The apparatus as in claim 11, wherein at least one of the layers of the network comprises a demilitarized zone (DMZ).

14. The apparatus as in claim 11, wherein the apparatus determines the access policy based in part on an identity of a user associated with the request.

15. The apparatus as in claim 14, wherein the apparatus determines the access policy based further in part on the particular endpoint.

16. The apparatus as in claim 11, wherein the apparatus determines the access policy for the particular endpoint by:
  determining a set of allowed commands with minimal privileges selected from among one or more of: a policy associated with a type of the particular endpoint and a policy associated with a layer in the hierarchy.

17. The apparatus as in claim 11, wherein the apparatus controls whether the command sent by the client is transmitted via the proxy chain to the particular endpoint by:
  blocking traffic conveying the command from being transmitted via the proxy chain.

18. The apparatus as in claim 17, wherein the process when executed is further configured to:
  provide an indication to the client that the command was blocked.

19. The apparatus as in claim 11, wherein the process when executed is further configured to:
  provide visual indicia of the plurality of networking devices and the hierarchy of layers of the network for display.

20. A tangible, non-transitory, computer-readable medium storing program instructions that cause a device to execute a process comprising:
  determining, by the device, a hierarchy of layers of a network comprising a plurality of networking devices;
  configuring, by the device and in response to a request by a client to access remotely a particular endpoint in the network, a proxy chain of remote access agents executed by a plurality of networking devices in the network to allow the client to access remotely the particular endpoint, each of those networking devices proxying traffic between different layers of the hierarchy;
  determining, by the device, an access policy for the particular endpoint indicative of which commands may be sent to the particular endpoint by the client, based in part on where the particular endpoint is in the hierarchy; and
  controlling, by the device and based on the access policy, whether a command sent by the client is transmitted via the proxy chain to the particular endpoint.

* * * * *